Figure 1:
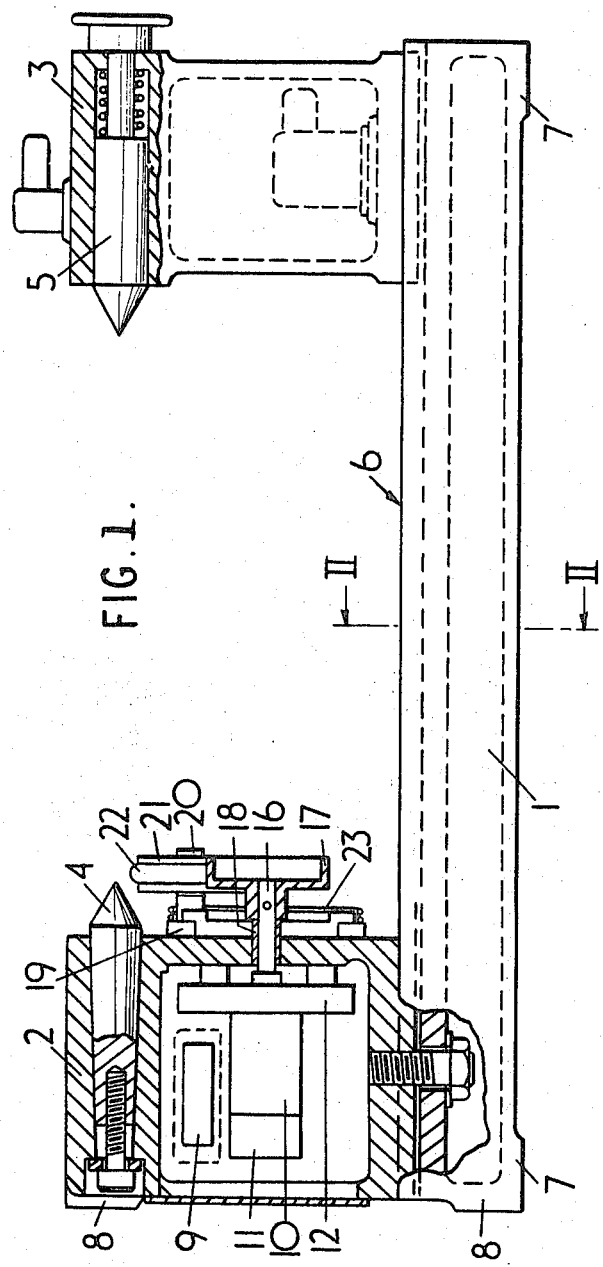

United States Patent [19]

Allix

[11] 3,791,039
[45] Feb. 12, 1974

[54] BENCH TEST CENTRES
[75] Inventor: Charles Vivian Marrett Allix, London, England
[73] Assignee: C. V. Precision Tools Limited, Chiswick, London, England
[22] Filed: Dec. 31, 1970
[21] Appl. No.: 103,227

[30] Foreign Application Priority Data
Jan. 6, 1970 Great Britain ..................... 672/70

[52] U.S. Cl. ............. 33/174 Q, 33/147 E, 33/199 B
[51] Int. Cl. ........................ B23b 33/00, G01b 5/10
[58] Field of Search 33/147 E, 174 Q, 199 B; 82/28, 82/28.2, 33, 40, 2 R; 144/209, 12, 13, 14

[56] References Cited
UNITED STATES PATENTS
2,170,510   8/1939   Trible ................................. 318/366
2,531,317  11/1950   Baney et al. ..................... 33/174 Q
1,868,594   7/1932   Black et al. ............................. 82/40
2,545,852   3/1951   Kurzweil ................................. 82/33
2,829,442   4/1958   Peickii ............................... 33/199 B
2,348,973   5/1944   Groene et al. ......................... 82/28

FOREIGN PATENTS OR APPLICATIONS
1,131,291  10/1968   Great Britain .................... 33/199 B Primary Examiner—Louis R. Prince
Assistant Examiner—Charles E. Phillips
Attorney, Agent, or Firm—Eugene D. Farley

[57] ABSTRACT

The component testing apparatus described comprises bench test centres. A headstock and a tailstock are mounted on a base; each stock has a body in which a centre is mounted. The component, when under test, is arranged between the two centres, which are coaxial. The headstock includes a drive for rotating the component under test. A brake is also provided to stop rotation of the component at a selected position.

4 Claims, 2 Drawing Figures

Patented Feb. 12, 1974 3,791,039

2 Sheets-Sheet 2

INVENTOR
CHARLES VIVIAN
MARRETT ALLIX

BY Eugene D. Farley

ATTORNEY

BENCH TEST CENTRES

The invention relates to the testing of components, such as shafts or similar components, which have been centred at both ends, between centres.

In bench test centres, the component is located between two centres housed respectively in a headstock and a tailstock. The stocks are mounted on a base which usually has a surface plate which serves as a reference surface. Either or both of the stocks may be movable along the base to adjust the separation of the centres, and the centres may be adjustable in the stocks.

In conventional practice, the contact point of a dial gauge mounted on the surface plate is brought to bear on the surface to be checked, and the component is rotated by hand to measure the accuracy of the surface, for eccentricity, or swash.

The present invention is based on the elimination of manual rotation of the component, thus enabling the inspector or operator to concentrate on the measurement of error and to use both hands in manipulating the measuring device in order to observe and record one or several dimensions.

The invention provides a headstock for component testing apparatus, the headstock having a body in which is mounted a centre and drive means for rotating a component when arranged between the centre and a further centre.

The drive means may comprise a motor and a transmission including a gear box. The component may be rotated by direct friction against the component, the centre being stationary or idle. An on-off switch for the motor or other drive means may cooperate with a braking device which allows the operator to stop the component dead at a selected position.

For example, with an electric motor coupled to a geared speed reduction unit, an electromagnetic brake is arranged to pull 'off' when energised, and clamp 'on' when de-energised, the brake mechanism being an integral assembly.

An important preferred feature is the provision of a dead stop device which can stop the rotation of the work between the centres (i) at the point of maximum run out (departure from desired profile) as shown by the probe or other measuring device, or (ii) when the run out exceeds a predetermined maximum which constitutes rejection of the work.

The work can be stopped at the point of maximum run out as determined visually by a clock or meter read out, or at any other point, by manually switching off the power drive, which automatically applies a powerful brake to stop the drive within one revolution of the drive shaft or approximately 2° of rotation of the work. An electro-magnetic brake would be energised by the motor control. With hydraulic, pneumatic, and clockwork drives, the brake would be operated simultaneously with the relay controlling the supply valve, or clutch controlling the drive.

For stopping at maximum run out the run out can be indicated on a meter from a proximity probe or mechanical contact with the work, and this meter incorporating special contacts, and/or a trailing pointer which would be left behind to indicate the maximum run out obtained on the first revolution of the work. On the second revolution, after closing an auxiliary switch, the work is stopped at the point of maximum run out by automatic control from the meter itself or by opening the motor switch when the reading of the meter reaches that of the trailing pointer. Alternatively, when the meter pointer starts to recede from a maximum position, a sensing head could operate a relay simultaneously to switch off the drive and de-energise the brake coils thereby stopping the drive.

For stopping when a predetermined tolerance is exceeded, the tolerance can be preset on the meter by a limit contact which energises the drive relay, which in turn cuts the supply to the drive and allows the brake to operate.

The operation of the drive-controlling relay for each of the main types of drive is preferably as follows: for electro-magnetic or induction drive the relay when energised interrupts the supply to motor and brake coils; for hydraulic or pneumatic drives, the relay closes a valve controlling the supply to the drive and the brake, or energises the brake; for clockwork mechanisms, the relay interrupts the supply to the clutch/-brake, which stops the drive.

The invention will be described further with reference to the accompanying drawings, which illustrate specific embodiments, by way of example only.

In the drawings:-

Figure 2:
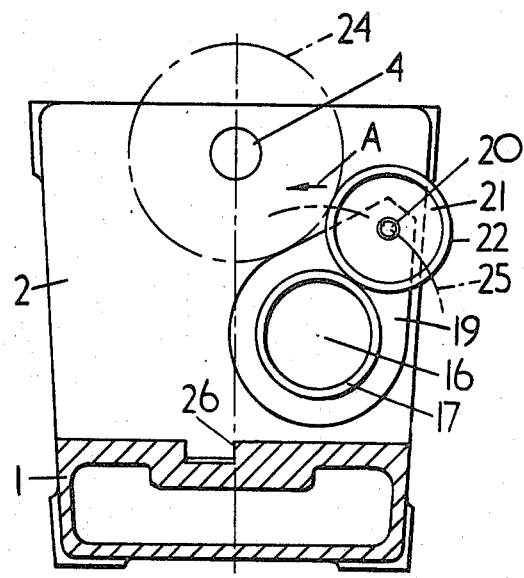

FIG. 1 is a diagrammatic side view, partly in longitudinal section, of one embodiment of component testing apparatus according to the invention; and FIG. 2 is a schematic section on line II—II of FIG. 1, certain parts being omitted for clarity.

As shown in the drawings, the testing apparatus comprises a base 1, of cast iron or pre-stressed aluminum alloy, on which a headstock 2 and a tailstock stock 3 are mounted. The stocks 2, 3 house respective 4, 5 which are accurately aligned with their centre-lines coincident, the centre-lines being parallel with the machined surface 6 of the base 1. The stocks 2, 3 are located in a longitudinal tee-slot having a reference edge in line with the centre-line of the centres. The tailstock 3 is of conventional design and is slidable longitudinally of the base 1 by means of a tee-slot guide. The base 1 has feet 7 for horizontal work; the apparatus can also be used vertically, when it rests on feet 8 formed on the headstock 2 and base 1.

Referring to FIG. 1, a manual or pedal operated on-off switch 9 controls an electric motor 10 and an electromagnetic friction brake 11 cooperating with a disc on the armature shaft. The motor 10 is an AC shaded-pole motor with a coil wound on a nylon bobbin covered in cotton tape and varnished. The motor 10 is connected to a gearbox 12 having an input gear of "Belrin," the other gears being of case-hardened steel. The brake 11, motor 10, and gearbox 12, are constructed as a rigid assembly mounted in the headstock, and this assembly can be replaced easily by removing the cover plate 15, disconnecting and withdrawing the assembly from the headstock, and inserting a replacement assembly.

The gearbox 12 provides a high gearing-down so that the centre 4 can be rotated at speeds of say 7, 12, 20, 50, or 100 rev/min. It is also possible to use a variable-speed motor. At low rotational speeds and high gearing-down, rapid braking of the motor, when the motor supply is switched off, will produce a virtually dead stop of the output spindle 16 of the gearbox 12 which extends from the headstock 2 and carries a driving drum 17. A bearing sleeve 18 coaxial with the drum 17 carries a pivotable arm 19 bearing an axle 20 on which a roller 21 is rotatably mounted. The circumference of the roller 21 is a rubber ring 22 which is frictionally engaged with the circumference of the drum 17 at all times; this frictional engagement is maintained when the arm 19 is pivoted. The axle 20 is urged by a torque spring 23 into a position in which the roller 21 abuts a component, such as a shaft 24 (FIG. 2), mounted between the centres 4, 5; the spring 23 forces the rubber ring 22 against the surface of the component, so that the rotation of the driving drum 17 is transmitted to the component.

FIG. 2 shows the ring 22 in contact with the surface of a shaft the profile of which is indicated in chain-dotted line at 24, the roller 21 being urged in the direction of arrow A. With components of different diameter the arm 19 adopts a position in which the ring 22 contacts the surface of the component; the axis of rotation of the roller 21 will lie somewhere along the chain-dotted line 25. The reference edge 26 of the tee-slot is in line with the centre-line of the centre 4.

For components having parts of large diameter which might interfere with the driving drum 17, the centre 4 can be extended beyond the drum 17, and the roller 21 can be provided with a pair of circumferential rubber rings, one of which contacts the drum 17, and the other of which lies beyond the tip of the centre, where it can contact the component.

I claim:
1. Component testing apparatus comprising:
   a. a base,
   b. a headstock mounted on said base,
   c. an undriven centre mounted in said headstock,
   d. a tailstock mounted on said base,
   d. an undriven centre mounted in said tailstock,
   f. said headstock and tailstock centres having a common centre-line and being adapted to support between them a component to be tested,
   g. a friction drive wheel,
   h. means mounting the friction drive wheel for movement toward said common centre-line for peripheral contact with a component mounted between said centres for rotating the component by said friction drive wheel,
   i. drive means engaging said friction drive wheel for rotating the latter at a component testing speed, and
   j. brake means associated with said drive means and actuable to brake the latter.

2. The component testing apparatus of claim 1 wherein said wheel mounting means comprises a pivotable arm, and spring means engages the arm for urging the wheel toward said common centre-line.

3. The component testing apparatus of claim 1 wherein said wheel mounting means comprises:
   i an arm mounting the friction drive wheel at one end thereof,
   l a driving shaft connected to the drive means for rotation by the latter,
   m bearing means mounting the opposite end of the arm for pivotal movement on an axis coaxial with said driving shaft, and
   n a driving drum on the driving shaft frictionally engaging the friction drive wheel for rotating the latter.

4. The component testing apparatus of claim 1 wherein said drive and brake means are mounted within said headstock, and said friction drive wheel is mounted on said headstock.

* * * * *